Feb. 28, 1933.  E. R. MAURER ET AL  1,899,205
DELIVERY VEHICLE
Filed Aug. 1, 1929   3 Sheets-Sheet 1
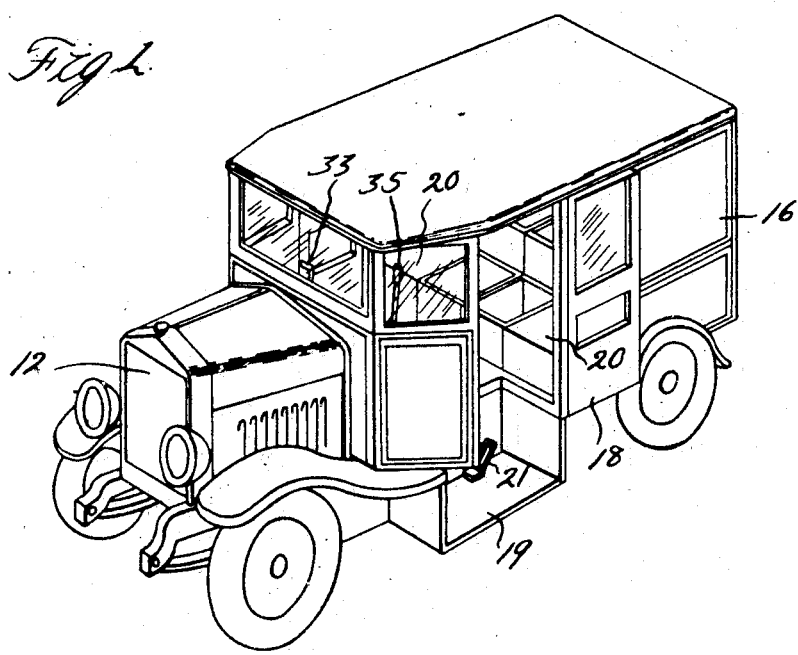
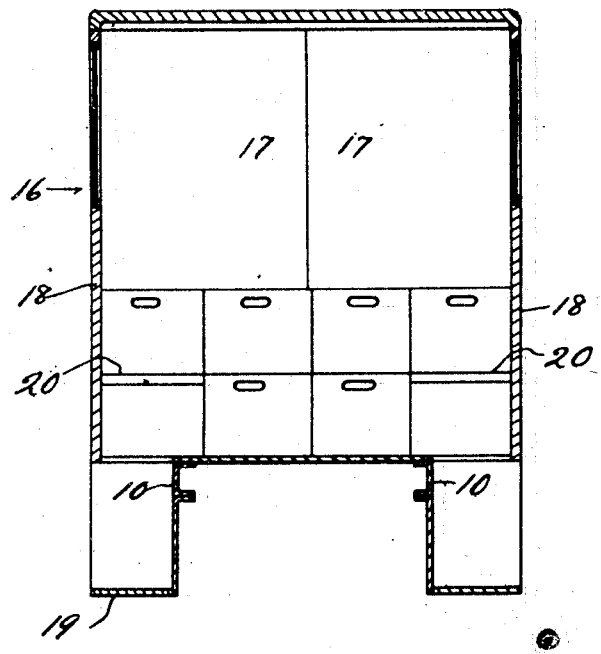
INVENTORS
Edwin R. Maurer
Donald M. Ferguson
BY
Whittemore Hulbert Whittemore
+ Belknap  ATTORNEYS

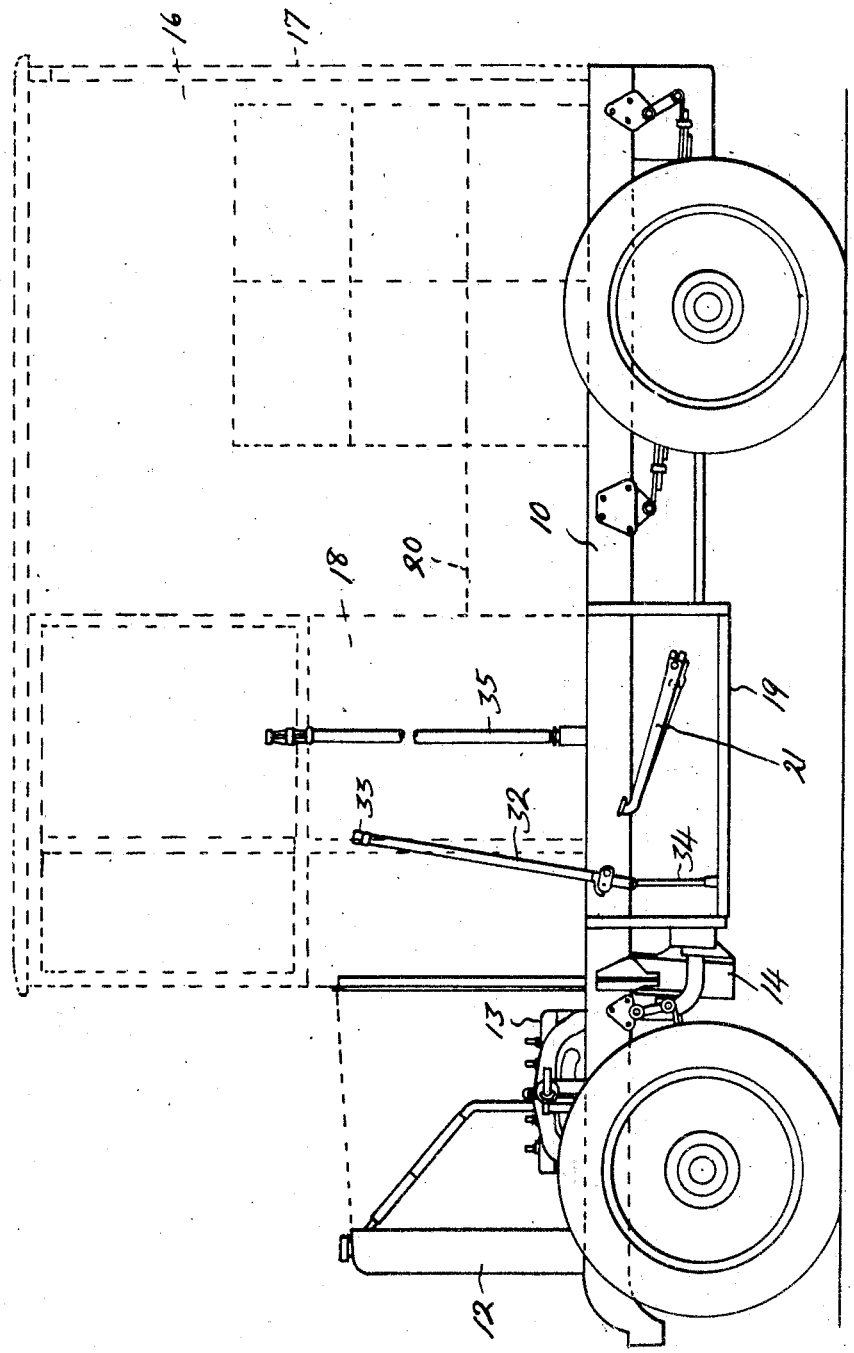

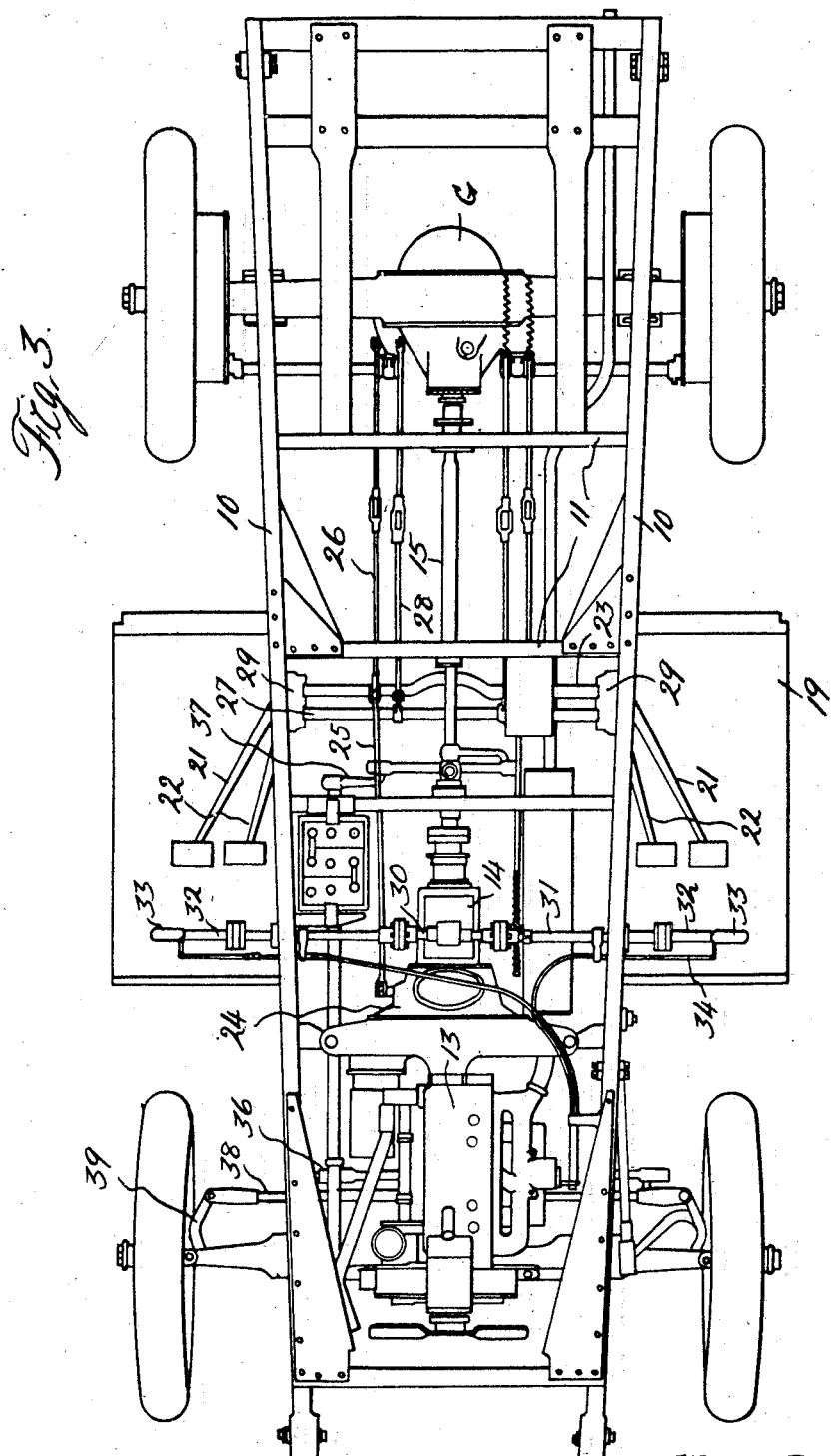

Patented Feb. 28, 1933

1,899,205

UNITED STATES PATENT OFFICE

EDWIN P. MAURER, OF DETROIT, AND DONALD M. FERGUSON, OF HIGHLAND PARK, MICHIGAN, ASSIGNORS, BY MESNE ASSIGNMENTS, TO CONTINENTAL-DIVCO COMPANY, OF DETROIT, MICHIGAN, A CORPORATION OF MICHIGAN

DELIVERY VEHICLE

Application filed August 1, 1929. Serial No. 382,817.

This invention relates to motor vehicles designed to be used as delivery cars and more particularly for house to house route deliveries such as milk routes.

It is one of the primary objects of this invention to obtain a construction of motor vehicles which while conforming to standard practice in many details of its construction, is so modified as to permit the operator to control the vehicle from a standing position upon either side thereof adjacent the load.

Another object of this invention is to provide platforms upon opposite sides of the vehicle depressed to substantially curb level and located within the boundaries of the vehicle body so that maximum weather protection is afforded the operator when standing on either platform.

A further object of this invention is to provide a delivery vehicle body with a storage compartment having a width substantially equal to the tread of the vehicle so as to provide maximum storage space for the load.

With the foregoing as well as other objects in view, the invention consists in the various features of construction as hereafter set forth.

In the drawings:

Figure 1 is a perspective view of a vehicle constructed in accordance with this invention.

Figure 2 is a side elevational view of the vehicle chassis.

Figure 3 is a top plan view of the construction shown in Figure 2; and

Figure 4 is a sectional view taken transversely through the vehicle body.

Generally described, our improvement comprises a chassis including an internal combustion engine with a change speed transmission, a propeller shaft and driving axle together with the usual controls therefor.

The engine is preferably of the vertical multicylinder type, and the transmission is preferably of the selective gear type. The foregoing parts may be of any suitable design. We have, however, departed from the usual practice by rearranging the vehicle controls so that the latter may be conveniently actuated from a standing position on either side of the vehicle. For accomplishing this result, we provide two sets of gear shifting, brake and clutch operating controls located above the platforms depending from opposite sides of the chassis. We further provide a steering mast arranged centrally of the vehicle and in alignment with the platforms so as to be readily reached from either of the platforms. The steering mast is rockable in a transverse plane and is so connected with the steering mechanism that the vehicle will be turned in the direction in which the lever is rocked.

The depressed platforms as hereinbefore stated are within the boundaries of the vehicle body so that the doors for closing the openings provided above the platforms may be closed to protect the operator from the weather while he is driving the vehicle from either platform. Arranged in rear of the door openings is the storage compartment having a width sufficient to receive at least 4 transverse rows of cases. Thus the general arrangement is such that a large portion of the load can be reached by the operator from a standing position upon either of the platforms, and he may also find access to the load through the rear doors of the body which extend substantially the entire width of the storage compartment.

In detail as specifically shown in the drawings 10 are the side sills of the chassis frame which extend horizontally from end to end. 11 are horizontally extending cross bars connecting the sills 10 in front, in rear and at intermediate points. 12 is a radiator mounted above the forward end of the frame. 13 is an internal combustion engine in rear of and spaced from the radiator, being mounted upon the frame and extending upward above the level of the side sills. 14 is a transmission preferably of the shift gear type arranged in rear of the engine 13. 15 is a propeller shaft between the transmission and the axle G, being preferably connected to the latter in the conventional manner.

The body 16 of the vehicle is mounted upon the side sills 10 and as previously described, is provided with rear doors 17 and side doors 18 located above the platforms 19. The latter, as before stated, are depressed to substantially curb level to provide standing height clearance within the body and are located within the boundaries of the latter so that the doors 18 may be closed to protect the operator from the weather when he is driving the vehicle. The portion of the body in rear of the side doors is used solely for storage of the load and is preferably of such dimensions as to be exactly divisible by the corresponding dimensions of the separate boxes or receptacles for receiving the articles to be delivered. Thus, in the event the vehicle is used on a milk route, the boxes containing the milk bottles may be arranged in transverse and longitudinal rows and in tiers so as to utilize all of the space in rear of the side doors. There is also space for at least two boxes between the raised seat portions 20 positioned in rear of the platforms 19 as clearly shown in Figure 1 of the drawings. The seat portions 20 are substantially the same dimension as the boxes, and when not in use may be used to support additional boxes. Substantially all of the boxes in the storage compartment are accessible from either platform or from the rear of the vehicle so that same may be readily and conveniently distributed.

Referring now more in detail to the distribution of the vehicle controls which renders possible controlling the vehicle from a standing position on either of the platforms 19, it will be noted that these controls include a pair of combined clutch and brake operating pedals 21 and a pair of brake actuating pedals 22. One pair of each of the pedals is arranged in a convenient position above the platforms 19 so as to permit the operator to control the vehicle from a standing position on either of the platforms. The pedals 21 are connected to the opposite ends of a rock shaft 23 extending transversely of the vehicle and which in turn is connected to the clutch in the housing 24 by a link 25. The rock shaft 23 is also connected by means of a link 26 to the brakes of the vehicle, sufficient lost motion being provided in the brakes permitting operation of the clutch upon initial movement of the pedal and actuation of the brakes upon a further movement of the pedal. The brake pedals 22 are connected to the opposite ends of a second rock shaft 27 arranged in juxtaposition to the rock shaft 23 and operatively connected to the brakes by means of a link 28. Both rock shafts are journaled in bearings 29 secured in any suitable manner to the side sills 10. The transmission 14, which is preferably of the shiftable gear type, is controlled by a rockable and slidable gear shifter 30 such as is used with the conventional type of control. The opposite ends of the shifter 30 are universally coupled with the links 31 which in turn are connected to the levers 32 arranged above the oppositely disposed platforms. Each of these levers is mounted in such a manner as to permit both of the rocking and the longitudinal sliding of the shifter 30 by either of the levers 32. Rotatively mounted upon the upper ends of the levers are the handle portions 33 which, as shown, are connected through suitable linkage 34 to the carburetor of the vehicle (not shown). With this arrangement, it will be apparent that the levers 32, in addition to effecting the gear shifting of the transmission, also are instrumental in governing the speed of the motor.

The steering of the vehicle may also be effected from a standing position on either of the platforms by a steering control mast 35 arranged centrally of the chassis in alignment with the opposite door openings. The steering mast 35 is fulcrumed to swing in a plane transversely to the chassis, and the connections are such that a rocking movement of the lever in either direction will effect a turning of the vehicle in the direction in which it is rocked. In detail as shown in Figure 3, the connection of the steering mast to the ground wheels is through a link 36 operated from the rock shaft 37 and connected to the cross link 38 which connects the wheels to the turning arms 39.

Thus from the foregoing, it will be apparent that we have provided a vehicle with platforms upon opposite sides thereof and controls for the vehicle so arranged with respect to the platforms as to be readily reached from either a standing position on the latter or a sitting position on the raised seat portions 20. Thus delivery is greatly facilitated for the vehicle may be moved from house to house while the operator is in standing position and in convenient proximity to the load from which delivery is made. Moreover, owing to the fact that the platforms are arranged within the boundaries of the vehicle body, maximum weather protection is afforded the operator while driving the vehicle by closing the side doors.

What we claim as our invention is:
1. A motor delivery vehicle comprising a chassis, a body mounted upon the chassis having opposite side door openings, platforms arranged within the boundary of the body and in alignment with said side door openings and disposed at a level affording standing height clearance within the body, a floor at substantially the level of said chassis, seat portions raised substantially above said floor arranged in rear of each of said platforms affording additional storage space when not in use, said seat portions being spaced apart sufficiently to receive two cases on the floor therebetween, motor control devices arranged above each platform and accessible for manipulation from either a standing position on the platform or a sitting position on said seat portions, and a laterally rockable steering mast arranged centrally within the body between the door openings in a position to be accessible from a position on either of said platforms or seat portions.

2. A motor delivery vehicle comprising a wheeled chassis having continuous side sills from front to rear, an internal combustion engine at the forward end of said chassis, a body on said chassis having the forward end thereof at the rear of said engine, said body projecting laterally beyond said side sills and having opposite side door openings, a pair of low level operating platforms within the boundaries of said body and outside the boundaries of said side sills, a laterally rockable steering mast projecting upwardly from said chassis between said operating platforms, gear selector rods projecting upwardly from each of said platforms, a combined brake and clutch pedal on each of said platforms and a second brake pedal on each of said platforms, said steering mast, gear selector rods and pedals being operable while standing on said platforms.

In testimony whereof we affix our signatures.

EDWIN R. MAURER.
DONALD M. FERGUSON.